No. 707,711. Patented Aug. 26, 1902.
E. J. NAPIER.
WHEEL CLAMP.
(Application filed May 3, 1902.)
(No Model.)
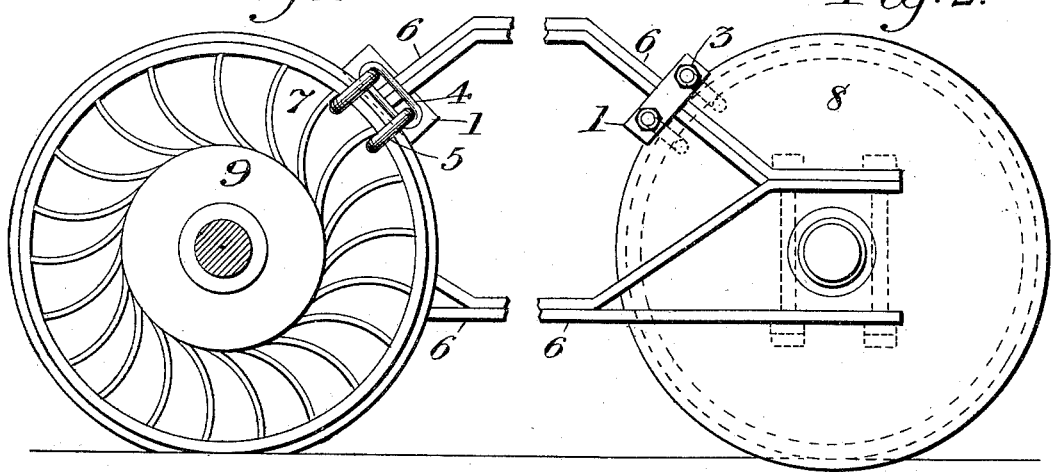
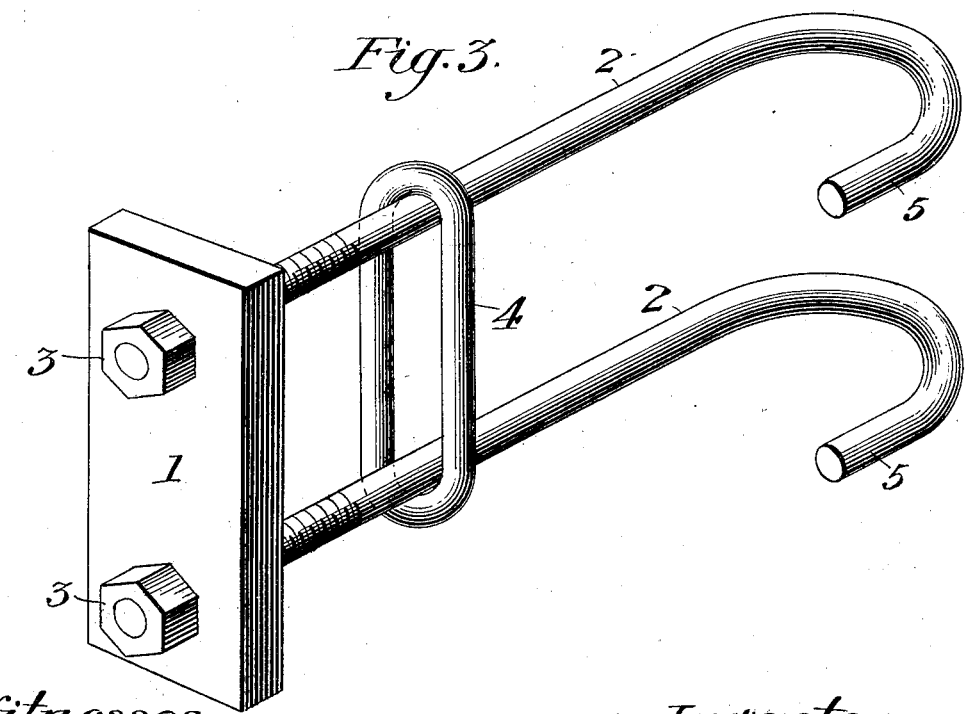
Witnesses:
M. J. Gleeson
Wm. B. Owens
Inventor:
Edward John Napier
THE NORRIS PETERS CO., PHOTO-LITHO., WASHINGTON, D. C.

UNITED STATES PATENT OFFICE.

EDWARD J. NAPIER, OF WESTERNPORT, MARYLAND.

WHEEL-CLAMP.

SPECIFICATION forming part of Letters Patent No. 707,711, dated August 26, 1902.

Application filed May 3, 1902. Serial No. 105,831. (No model.)

*To all whom it may concern:*

Be it known that I, EDWARD JOHN NAPIER, a citizen of the United States, residing at Westernport, in the county of Allegheny and State of Maryland, have invented certain new and useful Improvements in Wheel-Clamps; and I do hereby declare the following to be a full, clear, and exact description of the invention, such as will enable others skilled in the art to which it appertains to make and use the same.

It sometimes happens during the passage of a train over a railroad that a wheel becomes defective either by wearing flat upon a portion of the tread or a portion of the flange breaks off, thereby causing a serious delay to the train while locking the wheel prior to moving the car to the nearest place of repair. The method employed in locking a wheel of this kind, so far as I am aware, is by a chain, which is not only awkward and unsatisfactory, but causes much delay to the train, and there is great liability of the chain breaking. Now the object of my present invention is to obviate this difficulty. With this end in view I have devised a simple means of quickly causing a positive lock for the said disabled wheel, and thereby dispensing with the objectionable chain.

To this end my invention consists of a perforated block-yoke piece carrying the shanks of two hooks and a link loosely mounted thereon for engaging said shanks.

It is also obvious that my device may be used to lock the wheel or wheels of a car that is to be left standing for a considerable time upon a steep incline, such as a coal-dump, &c., as it frequently occurs that where air is wholly depended upon to hold the brakes the air is liable to slowly escape from the brake-cylinder to such an extent that the car may start down the incline at an inopportune time.

As above stated, the invention consists of a novel combination of parts, as will be hereinafter fully described and claimed.

In the accompanying drawings, forming a part of this specification, and in which like numerals of reference indicate corresponding parts, Figure 1 is a view of the application of my device to the frame of a car-truck in the position assumed when clamping a wheel, the view being from the inner side of the truck looking outward. Fig. 2 shows the manner of attaching the device to a car-truck frame viewed externally, and Fig. 3 is a view in perspective of my device complete.

The device consists of a block or yoke-piece 1, provided with two holes that receive screw-threaded shanks 2 of the hooks 5 and are adjusted thereon by nuts. The holes in the block or yoke-piece are smooth-bored in order that the threaded shanks may pass quickly therethrough, as is perfectly obvious.

Loosely mounted upon the shanks 2 is a link 4 for the purpose of properly supporting the shanks 2 when the device is in use and also to prevent said shanks from spreading.

In use the device is applied to the frame of a car-truck. In this instance what is known as the "diamond" truck is shown in Figs. 1 and 2, the yoke being applied in such position that the shanks straddle a portion 6 of the truck-frame, the link 4 bearing upon the tread of the wheel and the hoops 5 catching under the tread and against and engaging the ribs or corrugations 7 of the inner side 9 of the wheel 8, as shown in full lines, Fig. 1, and dotted lines, Fig. 2. It can be thus clearly seen that it is impossible for the wheel to turn either in a forward or backward motion of the car.

It should be understood that the device is not permanently secured to the car-truck frame. It is usually carried in some convenient place about the train or locomotive and is adapted to be applied to any car-truck in the train.

Various changes to meet conditions incidental to the style of truck used may be made in my device without departing from the spirit of my invention.

What I desire to claim and secure by Letters Patent is—

1. In a portable car-wheel clamp, a yoke, hooks with shanks therefor, said shanks adapted to be adjustably secured to said yoke, a link loosely mounted upon said shanks and in advance of said yoke, the whole providing means whereby the device may be clamped upon a portion of a car-truck frame and lock a wheel thereof rigidly to said frame, substantially as described.

2. In a wheel-clamp, a rod or shank bent into the form of a hook at one end, and screw-threaded at the other, a block adapted to be secured to a vehicle-frame, and to receive the threaded end of said shank, and the hooked end to engage the vehicle-wheel, substantially as described.

3. In a wheel-clamp, a perforated block or yoke, shanks bent into the form of a hook at one end, and screw-threaded at the other, adapted to adjustably engage the perforations in said yoke, screw-nuts for securing said shanks to said yoke, and a link loosely mounted on said shanks, substantially as described.

In testimony whereof I affix my signature in the presence of two subscribing witnesses.

EDWARD J. NAPIER.

Witnesses:
M. F. GLEESON,
WM. B. OWENS.